UNITED STATES PATENT OFFICE.

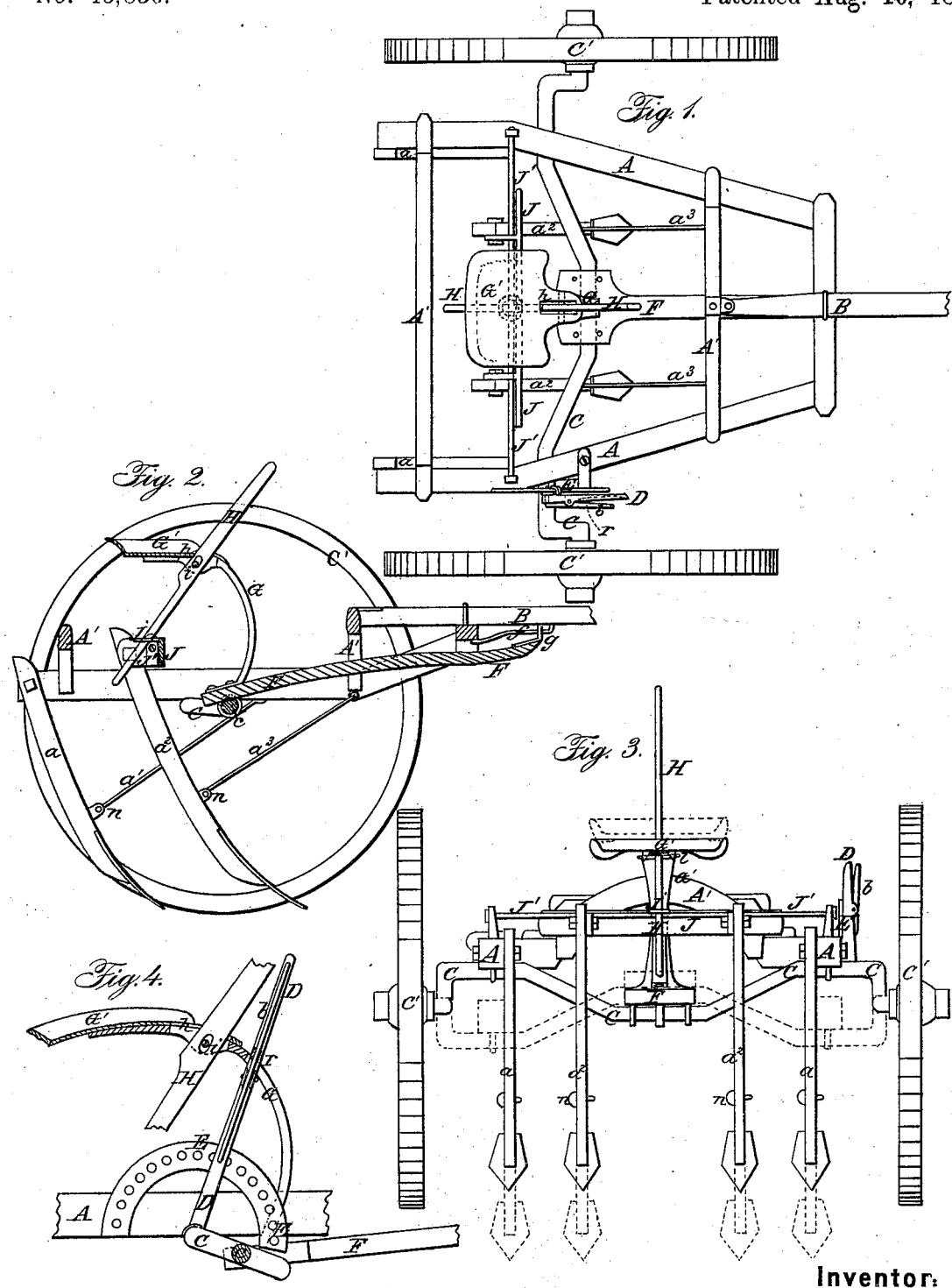

JOHN COX AND JOHN A. THROP, OF THREE RIVERS, MICHIGAN.

CULTIVATOR.

Specification forming part of Letters Patent No. 43,836, dated August 16, 1864.

*To all whom it may concern:*

Be it known that we, JOHN COX and JOHN A. THROP, of Three Rivers, county of St. Joseph and State of Michigan, have invented a new and Improved Cultivator; and we do hereby declare that the following is a full, clear, and exact description thereof, reference being had to the accompanying drawings, making a part of this specification, in which—

Figure 1 is a top view of our improved cultivator. Fig. 2 is a vertical longitudinal section through Fig. 1. Fig. 3 is a rear elevation, showing the parts in two positions. Fig. 4 is an enlarged view in detail of the device for adjusting the shovels and a sectional view of the driver's seat.

Similar letters of reference indicate corresponding parts in the several figures.

The object of our invention is to facilitate the raising and lowering of the shovel-frame by placing the point of rest of the driver's seat on the opposite side of the fulcrum from that upon which the frame of the machine rests, so that the weight of the driver, when in his seat, will balance, or nearly balance, the weight of the frame, and also so that the weight of both shall bear directly, or nearly so, on the fulcrum, as will be hereinafter described.

Another object of our invention is to afford the driver, while sitting on his seat, greater facility than hitherto for adjusting the forward shovels and guiding the same along the rows of plants, and at the same time enable him to properly guide and control his team, as will be hereinafter described.

To enable others skilled in the art to make and use our invention, we will describe its construction and operation.

In the accompanying drawings, C represents a cranked axle, and C' C' the carriage-wheels thereof. This axle is bent in such manner as to constitute a lever, those portions which enter the hubs of the wheels C' C' being the fulcrum of this lever. One arm of said lever would be represented by the two side cranks, upon which the frame A of the machine is supported and connected by means of staples, as represented in Figs. 2 and 3, and the other arm of said lever is represented by the intermediate crank, upon which the driver's seat G' rests, as shown in Figs. 1, 2, and 3. By this arrangement of the frame and driver's seat on opposite sides of the points of support of the lever or cranked axle C, it will be seen that when the driver raises or lowers the frame A, as will be hereinafter described, the points of rest of the frame A approach or recede from the line of the fulcrum, and at the same time the point of rest of the driver correspondingly approaches or recedes from the same line, so that whether the point of rest of A or that of G' is horizontal or perpendicular, or inclines at any angle, the distance from the point of rest of A to a line coinciding with the axis of motion of the axle and the distance from the point of rest of G' to said line constantly bear the same relation to each other, and hence in whatever position the axle be placed the whole weight of the driver and the frame perpetually rest squarely on the fulcrum at the wheels. By this arrangement it will also be seen that the weight of the driver can be made to balance the weight of the frame, and a very little expenditure of power will therefore be required on the part of the driver to elevate or depress the frame of the machine for the purpose of regulating the depth it is desired the shovels should run, or for elevating the shovels entirely above the surface of the ground.

On one side of the frame A we secure a vertical semicircular plate, E, which is perforated, as shown in Fig. 4, the arrangement of the perforations being concentric with that portion of the axle upon which this side of the frame rests, and to this portion of the axle a long hand-lever, D, is rigidly affixed outside of frame A and alongside of plate E. This lever D has a lever, $b$, pivoted to it, which is constructed with a hook or latch-pin on its lower end passing through lever D and entering the plate E, which hook is held in its place in one or the other of the perforations in plate E by means of an india-rubber block, $r$, Figs. 1 and 4, placed in the crotch of the two levers above the pivot-connection of $b$. By means of the lever D the driver can elevate or depress the frame of the machine, and by means of the lever $b$ he can lock the frame to the axle at any desired point of adjustment.

We have represented one mode of supporting the driver's seat in the proper position on the axle C, which we will describe, although we do not confine ourselves to this mode exclusively. The standard G of seat G' is rigidly affixed to the top of a foot-rest, F, directly above the point of support of said rest on the axle C, and this foot-rest is connected to the axle C at one end by a loose joint, so that the seat G' will preserve its proper position during the adjustment of the frame A, above described. At the other end the foot-rest has an eye-plate, $g$, secured to it, through which eye the guide-bar $f$ passes, as shown in Fig. 2. The longitudinal bar or stirrup $f$ is secured at one end to the draft-pole B and at the other end to the bottom of the forward transverse brace of frame A, as shown in the above figure.

The object of the foot-rest or stay-rod F is to keep the driver's seat in a proper position, notwithstanding this seat is hinged or pivoted to or on its axle, and the forward sliding connection of the stay-rod with the front end of frame A is to allow the former to accommodate itself to the movements of the intermediate crank of the axle C.

The rear shovel-standards, $a\ a$, are secured to the rear extremities of the longitudinal beams of frame A and strengthened by means of braces $a'\ a'$, the rear ends of which are attached to their respective standards by means of wooden pins $n\ n$ passing through eyes formed on said rods.

The forward shovel-standards, $a^2\ a^2$, are connected at their upper ends to projections formed on a laterally-sliding plate, J, and these standards are braced by means of rods $a^3\ a^3$, which are pivoted to frame A, and connected by wooden pins $n\ n$ to their respective standards, as shown in Fig. 2. The plate or slide J works upon a transverse guide and support, J', sustained at its ends by posts projecting up from the side beams of frame A, and this slide J is moved by means of an inclined lever, H, which is connected to it loosely by the loop $j$, through which the lower end of said lever passes. The lever H passes up through an oblong slot, $h$, which is made through the crotch or central forward portion of the driver's seat G', and also through the standard upon which seat G' is supported, and the transverse pin $i$ is used to pivot the lever to the standard and seat G' G, as shown in Figs. 2 and 4. This pivot-connection of the lever H should be such as will allowed the driver, while sitting in his seat with this lever projecting between his legs, to give a laterally-vibrating movement to it, and thus move the forward standard from right to left, or vice versa, and keep the shovels in a proper relation to the row of plants under cultivation.

The wooden pins $n\ n$, which are used to connect the rear ends of the brace-rods $a^3\ a^3$ to the forward shovel-standards, $a^2\ a^2$, should be of sufficient strength to resist all ordinary pressure or strain upon the shovels; but should these shovels strike any obstruction which would be likely to bend the guide-rod J' or otherwise derange any of the parts of the machine these pins will break and release the shovel-standards, and they can be replaced by new pins again. Without these wooden pins or some equivalent device answering the same purpose the parts which enable us to give a lateral movement to the shovel-standards would be liable to become inoperative, and for this reason the wooden pins are especially valuable in this machine.

It will be seen from the above description that if the central portion of the axle C is in a line with those portions of this axle which pass through the hubs of the wheel and the driver's weight is brought to bear directly upon said central portion the driver will not change his position when raising or lowering the frame A, nor will he be under the necessity of lifting his own weight; and in proportion as the said central portion of the axle is projected beyond a line passing through the axes of the wheels C', so will the weight of the driver operate to counteract the weight of the frame A, and in this manner the only resistance which the driver will have to overcome in raising or lowering the frame A will be the friction of the several joints.

What we claim as new, and desire to secure by Letters Patent, is—

1. So constructing the axle C that it constitutes a rocking-lever support for the frame A and driver's seat G' and a means by which said frame can be raised or depressed, substantially as herein described.

2. The combination of the lever D, or its equivalent, with an axle the points of support of which for the driver's seat and shovel-frame are arranged on opposite sides of the fulcrum or axis of motion of said axle, substantially as described.

3. Arranging the driver's seat and frame of the machine upon a supporting-axle in such manner that the weight of one can be made to counterbalance the weight of the other whether the point of rest of the driver's seat be on the opposite side of the fulcrum from that upon which the frame rests or directly over the fulcrum, or at any point between the fulcrum and the frame, substantially in the manner set forth.

4. The connecting or stay rod F, or its equivalent, in combination with the driver's seat sustained substantially as described.

5. The combination of pivoted lever H, loop $j$, slide J, guide-rod J', shovel-standards $a^2\ a^2$, pivoted stay-rods $a^3\ a^3$, and wooden pins $n\ n$, all constructed and arranged substantially as described.

JOHN COX.
JOHN A. THROP.

Witnesses:
E. H. LOTHROP,
WM. GRIFFITHS.